(12) United States Patent
Kimball

(10) Patent No.: US 8,764,202 B1
(45) Date of Patent: Jul. 1, 2014

(54) RETRO-REFLECTIVE ARTICLE

(75) Inventor: Brian R. Kimball, Shrewsbury, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 88 days.

(21) Appl. No.: 13/443,186

(22) Filed: Apr. 10, 2012

Related U.S. Application Data

(60) Provisional application No. 61/473,837, filed on Apr. 11, 2011.

(51) Int. Cl.
*G02B 5/12* (2006.01)

(52) U.S. Cl.
USPC .......................................................... 359/515

(58) Field of Classification Search
USPC ................... 359/515, 529, 546; 385/901, 902
See application file for complete search history.

(56) References Cited

U.S. PATENT DOCUMENTS

| | | | |
|---|---|---|---|
| 4,336,092 A | 6/1982 | Wasserman | |
| 4,697,407 A | 10/1987 | Wasserman | |
| 5,579,429 A * | 11/1996 | Naum | 385/143 |
| 5,962,108 A | 10/1999 | Nestegard | |
| 6,031,958 A | 2/2000 | McGaffigan | |
| 6,735,789 B2 * | 5/2004 | Kelleher et al. | 2/458 |
| 7,690,331 B2 * | 4/2010 | Hurwitz | 119/795 |
| 8,033,671 B1 * | 10/2011 | Nilsen et al. | 359/529 |
| 8,157,391 B1 * | 4/2012 | Nilsen et al. | 359/529 |
| 2004/0169928 A1 * | 9/2004 | Nilsen et al. | 359/529 |
| 2007/0062433 A1 | 3/2007 | Hurwitz | |
| 2008/0225548 A1 | 9/2008 | Eichelberger | |
| 2009/0025872 A1 * | 1/2009 | Nilsen et al. | 156/278 |
| 2009/0180511 A1 | 7/2009 | Muendel | |
| 2009/0232453 A1 * | 9/2009 | Muendel | 385/43 |
| 2010/0024103 A1 * | 2/2010 | Kelleher et al. | 2/458 |
| 2010/0221419 A1 | 9/2010 | Frey | |
| 2011/0170193 A1 * | 7/2011 | Budd et al. | 359/518 |

OTHER PUBLICATIONS

Kimball et al., "Directionally reflective fiber from multicomponent fiber extrusion", SPIE Newsroom, Dec. 29, 2010.
Aranda et al., "Optical properties of a retro-reflection fiber cross section formed via tri-component fiber extrusion", Proc. SPIE 7781, 778107 (Aug. 2010).

\* cited by examiner

*Primary Examiner* — Frank Font
(74) *Attorney, Agent, or Firm* — Roger C. Phillips, Esq.

(57) ABSTRACT

Disclosed is a retro-reflective article that can comprise at least one fiber having a first component with a first surface, where the first surface can be shaped to define at least one retro-reflective feature, and wherein the retro-reflective feature can be configured to provide more than one reflection of light incident thereon.

20 Claims, 5 Drawing Sheets

RETRO-REFLECTIVE ARTICLE

CROSS-REFERENCE TO RELATED APPLICATION

This application claims priority to provisional patent application 61/473,837, filed 11 Apr. 2011 and entitled "Optical Properties of a Retro-Reflection Fiber Cross Section Formed Via Tri-Component Fiber Extrusion", and which is hereby incorporated by reference.

FIELD OF THE INVENTION

The present invention pertains to a retro-reflective article, and more particularly, to a retro-reflective article comprising a fiber having retro-reflective properties.

BACKGROUND

The most common retro-reflectors found in everyday applications are corner cubes composed of three orthogonal mirrors, corner cube pyramid shaped prisms and microspheres made out of glass or various plastics. Microspheres are commonly used in the textiles industry for either aesthetic reasons or in order to provide higher night visibility features to fabrics. Retro-reflectors find many uses including many related to promoting health, safety or welfare. For example, retro-reflection technology is commonly used in highway safety applications. Roads and street signs can include retro-reflectors to increase their visibility at night. Light from an oncoming vehicle's headlights is reflected back towards the vehicle operator's eyes by appropriate retro-reflectors embedded in lane markers or included with road signs. Garments worn by highway workers can include retro-reflectors so that the workers are more readily seen during night road work operations.

U.S. Pat. No. 4,336,092, entitled "Retroreflective Fiber and Method of Making Same" and issued 22 Jun. 1982, appears to relate to making a thread-like continuous retro-reflective fiber. A thread-like fiber is made by laminating a thin film of retro-reflective material to a supporting polyester film, and then slitting the laminate to form narrow strips of retro-reflective material having sufficient strength to be combined with other fibers to form a composite yarn having retro-reflective characteristics, which composite yarn may then be woven, knitted, or spun to provide a fabric having retro-reflective characteristics.

U.S. Pat. No. 5,962,108, entitled "Retroreflective Polymer Coated Flexible Fabric Material and Method Of Manufacture" and issued 5 Oct. 1999, appears to relate to a process and article for a retro-reflective polymeric coated flexible fabric material having a retro-reflective layer and a polymeric compatibilizing layer welded to a polymeric coated outer surface of a flexible fabric material. The compatibilizing layer provides an intermediate layer between the retro-reflective layer and the flexible fabric material to create bond strength between dissimilar polymers.

US Patent Application Publication 2007/0062433, entitled "Abrasion Resistant Omnidirectionally Reflective Rope" and published 22 Mar. 2007, appears to relate to a flexible abrasion resistant omnidirectionally reflective rope having a central braided high strength core comprising gel fiber or p-aramid fibers that is surrounded by a cylindrically braided sleeve of reflective strips composed of narrow width reflective strips that comprise a woven or knitted narrow width strip and a flexible nylon retro-reflective sheet sewn thereon and covered with abrasion resistant coating. It appears that the flexible retro-reflective sheet is formed by thermally bonding corner cube, microsphere retro-reflectors, or wide angle exposed retro-reflective lenses to a flexible polymeric sheet. Due to its braided construction, the reflective rope is described as reflecting light omnidirectionally over a large angle of acceptance, thereby providing an improved measure of safety in the marine craft environment.

Although known retro-reflectors and techniques for using them have proven useful, there are disadvantages and drawbacks. Room for improvement remains and would be a welcome advance in the art.

SUMMARY OF THE INVENTION

In one aspect, the invention provides a retro-reflective article comprising at least one fiber having a first component having a first surface shaped to define at least one retro-reflective feature, where the retro-reflective feature is configured to provide more than one reflection of light incident thereon.

In other aspects of the invention, the fiber can extend longitudinally and the retro-reflective feature can be formed along the length of the fiber. The fiber can be flexible. The fiber can comprise a plurality of retro-reflective features. The plurality of retro-reflective features can be positioned in series along a perimeter of the cross section of the fiber. The retro-reflective feature can comprise a first side and a second side. The first side and second side can each form substantially flat surfaces. The retro-reflective feature can comprise a first side oriented at approximately ninety degrees from the second side.

In additional aspects of the invention, the fiber can be configured to retro-reflect light that is incident upon the retro-reflective feature from the outside of the fiber. The fiber can be configured to retro-reflect light that is incident on the retro-reflective feature from the inside of the fiber. The fiber can be configured to exhibit prismatic effects. The fiber can comprise a polymer. The fiber can comprise a polymer selected from the group consisting of: polypropylene, nylon and polyester.

In further aspects of the invention, the article can comprise a structure with the at least one fiber interlaced in the structure. The article can comprise a periodic structure incorporating the fiber. According to one example, the at least one fiber can be woven, braided, knit or spun, or the like, into a periodic pattern. The article can comprise apparel. The article can comprise a sensor. The article can comprise a hazard detector and the fiber can be utilized in detection of the hazard.

In yet other aspects of the invention, the fiber can comprise a second component having a second surface 20. The first and second components can have different refractive indices. The second surface 20 of the second component 2 can be shaped to define at least one retro-reflective feature, and wherein the retro-reflective feature of the second surface is configured to provide more than one reflection of light incident thereon. Each component of the article can have a lower index of refraction than the next adjacent outer component. Each component of the article can have a higher index of refraction than the next adjacent outer component. The fiber can comprise at least one resonant region. The first and second surfaces can define at least one resonant region therebetween. The fiber can comprise a plurality of resonant regions. The first and second surfaces can define a plurality of resonant regions therebetween. One or more of the foregoing resonant regions can include at least one retro-reflective feature capable of creating multiple reflections in the resonant region. One or more of the foregoing resonant regions can comprise at least one retro-reflective feature defined by the first surface and at least one retro-reflective feature defined by the second surface, the retro-reflective features aligned to reflect light back toward the other. The fiber can comprise a resonant region having a concentric cross section. The fiber can comprise a resonant region having a square cross sectional shape. The fiber can further include a third component. At least one component can have a higher index of refraction than the other two components.

In yet further aspects of the invention, the retro-reflective article can comprise at least one additive. The additive can comprise a fluorophore. The additive can comprise a phosphor. The additive can comprise a nanoparticle. The additive can comprise a metal oxide. The fiber can comprise a conductive material and can be configured such that applying a voltage across a length of the fiber alters the reflective or absorptive characteristics of the additive. The additive can comprise a cholesteric liquid crystal.

A fiber having more than one component refers to a fiber including a first component and one or more additional components each having an additional surface. "Multi-component" refers to a fiber structure where two or more distinct polymers are present in the fiber cross section.

"Retro-reflectivity" or "retro-reflection" refers to the optical phenomenon in which reflected light rays preferentially follow a path close to the opposite of the direction from which they were incident on a medium.

The aspects noted above recite many features of the invention. Any of the features noted herein can be combined with any of the other features in any of the aspects, practices or embodiments of the invention described herein, except where clearly mutually exclusive or a statement is explicitly made herein that such a combination is unworkable or otherwise outside scope of the invention. To avoid undue repetition and length of the disclosure, all the possible combinations of features are not explicitly recited.

Not every component is labeled in every one of the foregoing figures, nor is every component of each embodiment of the invention shown where illustration is not considered necessary to allow those of ordinary skill in the art to understand the invention. The figures are schematic and not necessarily to scale.

When considered in conjunction with the foregoing figures, further features of the invention will become apparent from the following detailed description of non-limiting embodiments of the invention.

DETAILED DESCRIPTION

Various features of the invention will be described with respect to the following exemplary embodiments, however, the invention is not limited to the following combinations of features. The various aspects of the invention described herein can be combined and applied in the manner needed to further enhance, optimize or tune the optical performance to attain the results needed for a given application.

Figure 1:
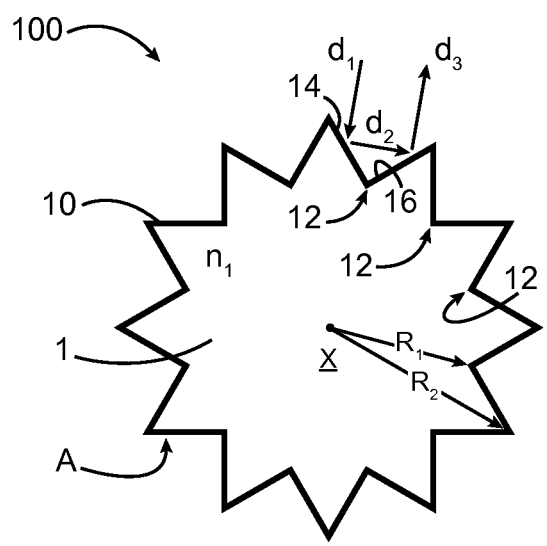
FIG. 1 schematically illustrates a cross section of a fiber of a retro-reflective article according to an embodiment of the invention.

FIG. 1 illustrates an exemplary single component fiber 100 including a component 1 having a first surface 10 shaped to define at least one retro-reflective feature 12 which is configured to retro-reflect light incident on the fiber. The retro-reflective feature 12 is configured to provide multiple reflections of light to produce a desired retro-reflective effect. In the embodiment shown in FIG. 1, retro-reflective feature 12 is configured to provide the desired retro-reflection of light incident on the feature from outside component 1. Retro-reflective feature 12 includes a first side 14 and a second side 16 defined by surface 10 for providing the multiple reflections of light that produce the retro-reflective effect. For example, with reference to a retro-reflective feature 12, a ray of light following direction d1 and incident on first side 14 is then reflected in direction d2 to the second side 16 where it is reflected in direction d3 back along a path close to the opposite of the direction from which it was incident, thereby achieving a retro-reflective effect. In this manner the retro-reflective feature 12 provides multiple reflections within the retro-reflective feature 12 to produce a retro-reflective effect. The fiber 100 of this embodiment has a longitudinal length with a central longitudinal axis X defined through the center of the fiber 100, and a cross section defined in a plane perpendicular to the longitudinal axis X.

Figure 9:
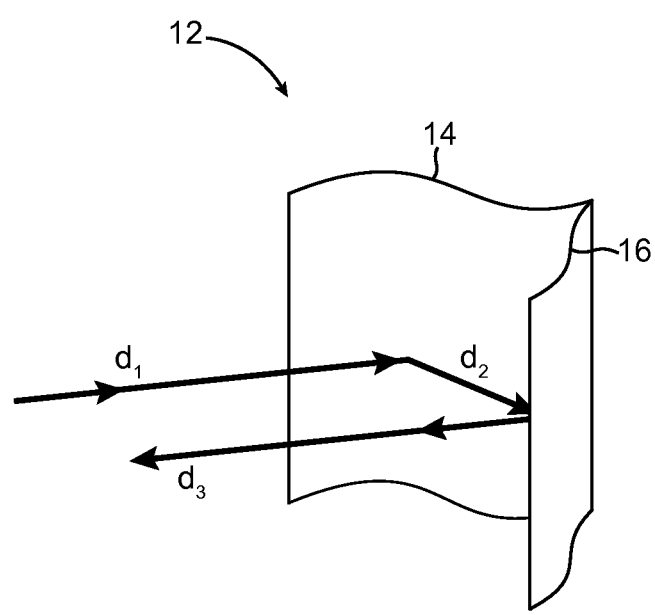
FIG. 9 schematically depicts retro reflection by a retro-reflective feature, including the incident light being reflected more than once by the retro-reflective feature.

FIG. 9 illustrates a cutaway perspective view of the retro-reflective feature 12 providing more than one reflection of light incident thereon from outside the fiber 100. Retro-reflective feature 12 includes first side 14 and second side 16. As illustrated, incident light having direction d1 is received at first side 14, redirected in direction d2 and received at second side 16, and redirected again in direction d3 toward the source of the incident light.

As illustrated in FIG. 1, according to one aspect, the outermost points of first side 14 and second side 16 are each set at radial distance R2 from the longitudinal axis X, and the inner most point of first side 14 and second side 16 meet at a radial distance R1 from the longitudinal axis X. According to one aspect, retro-reflective feature 12 is symmetric such that a radial line through the point at which first side 14 and second side 16 meet bisects the retro-reflective feature 12. According to one aspect, first side 14 and second side 16 each form substantially flat surfaces. According to one aspect, the first side 14 may be oriented approximately 90 degrees from second side 16.

As shown in FIG. 1, the fiber 100 may further include a plurality of retro-reflective features thereby enhancing the reflectivity of the article. Further, the plurality of retro-reflective features 12 may be formed in series adjacent to one another and following the perimeter of fiber 100 and defining cross section shape A. The retro-reflective features may be substantially identical. One benefit is that the retro-reflective features arranged in this manner increase the surface area of surface 10 available to receive and retro-reflect light. The retro-reflective feature 12 or plurality of retro-reflective features 12 may extend along surface 10 along the length of the fiber.

Figure 2:
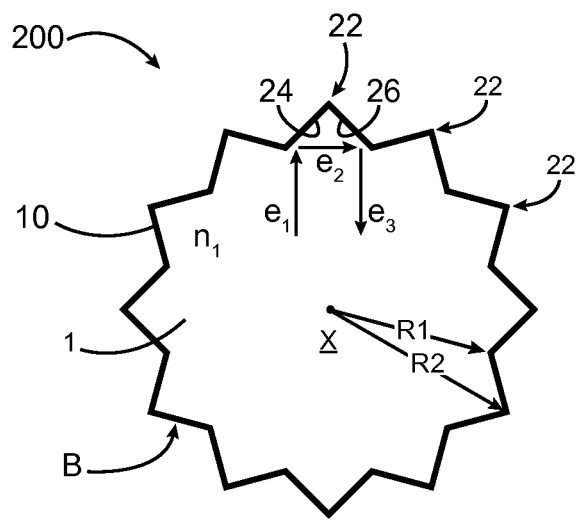
FIG. 2 schematically illustrates a cross section of a fiber of a retro-reflective article according to an embodiment of the invention.

FIG. 2 illustrates an exemplary single component fiber 200 with a component 1 having a first surface 10 shaped to define a retro-reflective feature 22 which is configured to provide a desired retro-reflection of light incident from inside the fiber. The retro-reflective feature 22 is configured to provide multiple reflections of light to produce the desired retro-reflective effect. According to one aspect of the invention, retro-reflective feature 22 is configured to provide a desired retro-reflection of light incident on the feature 22 from inside the fiber (which light may first be incident on the fiber and propagate within the fiber to reach feature 22). Retro-reflective feature 22 includes a first side 24 and a second side 26 each formed by surface 10 for providing the multiple reflections of light that produce the retro-reflective effect. For example, a ray of light following direction e1 and incident on the first side 24 is reflected in direction e2 to a second side 26 where it is reflected in direction e3 back along a path close to the opposite of the direction from which it was incident, thereby achieving a retro-reflective effect. In this manner the retro-reflective feature provides multiple reflections within the retro-reflective feature and component 1 to produce a retro-reflective effect in component 1. The fiber of this embodiment has a longitudinal length with a central longitudinal axis X defined through the center of the fiber 200, and a cross section defined in a plane perpendicular to the longitudinal axis X.

According to one aspect, the outermost points of first side 24 and second side 26 meet at radial distance R2 from the longitudinal axis X, and the inner most point of first side 24 and second side 26 are each at a radial distance R1 from the longitudinal axis X. According to one aspect retro-reflective feature 22 is symmetric such that a radial line through the point at which first side 24 and second side 26 meet bisects the retro-reflective feature 22. According to one aspect, first side 24 and second side 26 each form substantially flat surfaces. According to one aspect, the first side 24 may be oriented approximately 90 degrees from second side 26.

As illustrated in FIG. 2, the fiber 200 may further include a plurality of retro-reflective features 22 thereby enhancing the reflectivity of the article. Further, the plurality of retro-reflective features 22 may be formed in series adjacent to one another and following the perimeter of fiber 200 defining a cross section with perimeter shape. The retro-reflective features may be substantially identical. One benefit is that the retro-reflective features 22 arranged in this manner increase the surface area of surface 10 available to receive and retro-reflect light. According to one aspect of the invention, the retro-reflective feature 22 or plurality of such retro-reflective features extend along surface 10 along the length of the fiber.

Figure 3:
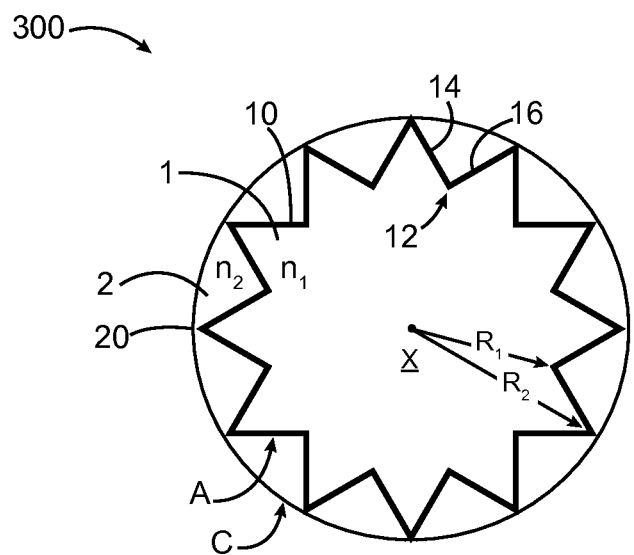
FIG. 3 schematically illustrates a cross section of a fiber of a retro-reflective article according to another embodiment of the invention.

According to one method of processing, the embodiments described with reference to FIG. 1 and FIG. 2, the retro-reflective features are formed by an extrusion process where the fiber material is forced through a series of plates resulting in the cross section having the desired shape. According to another method, fibers 100 and 200 may be initially formed with a first component and an intermediate second component that protects the features of the first component during processing. The intermediate second component may be comprised of a dissolvable material such as EVOH. After the fiber is created or incorporated into the article, the second component is then dissolved, leaving only the first component. For example during processing, the fiber may have a cross-section as shown in FIG. 3 where the fiber has a cross-section that includes first component 1 with cross section perimeter shape A and second component 2 with cross-section perimeter shape C. The second component 2 could be comprised of dissolvable material EVOH which protects the shape of component 1 during processing, and is later dissolved to leave only first component 1. After component 2 is dissolved, the result would be an article with a single component fiber 100 as shown in FIG. 1.

The fiber of the retro-reflective article may comprise a fiber having more than one component. The fiber having more than one component includes a first component 1 and one or more distinct additional components.

FIG. 3 illustrates an exemplary bi-component fiber 300. The fiber 300 can include features, and combinations thereof, that are substantially the same as the fiber 100 of FIG. 1, with the modification(s) now described. The bi-component fiber 300 includes a first component 1 substantially the same as fiber 100 of FIG. 1 and additionally has a second component 2, where first surface 10 is now at the interface between the first component 1 and the second component 2, and where the second component 2 has a second surface 20. In this embodiment, at least one retro-reflective feature 12 is configured at the first surface 10 for receiving light incident from outside component 1 and propagating through component 2 and retro-reflecting light back into component 2 toward second surface 20. Retro-reflection properties of retro-reflection feature 12 will be enhanced if index of refraction n2 of outer component 2 is greater than index of refraction n1 of component 1. The greater the difference of the indices of refraction, the greater the retro-reflection from retro-reflection feature 12. In this bi-component fiber 300, retro-reflective feature 12 will provide multiple reflections of light through component 2. By including an additive in component 2, the additive is placed where it will be excited by the multiple reflections created by the retro-reflection feature 12. For certain applications, use of additive can be enhanced by using it in (or limiting its use to) the volume of component 1 where it will receive multiple reflections of light as a result of retro-reflective features 12. According to one aspect, second surface 20 may additionally reflect a fraction of light back toward a retro-reflective feature 12 on the first surface 10 thereby creating multiple reflections between surface 10 having at least one retro-reflective feature 12 and surface 20, thereby defining a resonant region in component 2.

Figure 4:
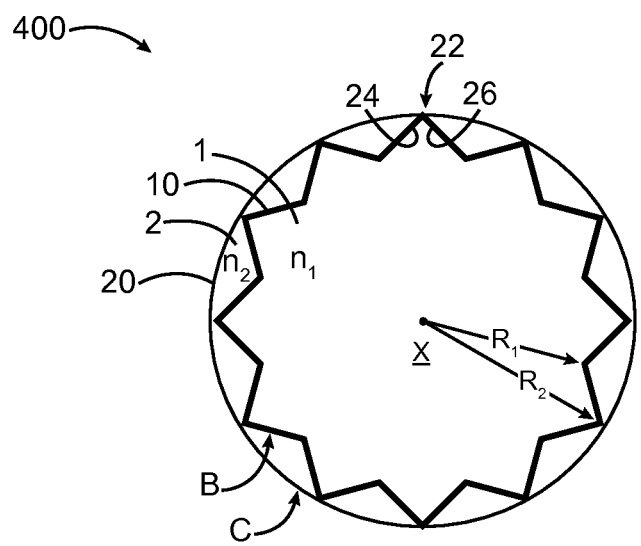
FIG. 4 schematically illustrates a cross section of a fiber of a retro-reflective article according to an additional embodiment of the invention.

FIG. 4 illustrates an exemplary bi-component fiber 400. The fiber 400 can include features, and combinations thereof, that are substantially the same as the fiber 200 of FIG. 2 with the modification(s) now described. The bi-component fiber 400 includes a first component 1 with surface 10 and in addition a second component 2 with second surface 20. First surface 10 is now at the interface between the first component 1 and the second component 2. In this embodiment, at least one retro-reflective feature 22 is configured at the first surface 10 for receiving light propagating through component 1 and providing a desired retro-reflective effect of light back into component 1. Retro-reflection properties of retro-reflection feature 22 will be enhanced if index of refraction n1 of component 1 is greater than index of refraction n2 of component 2. The greater the difference of the indices of refraction, the greater the retro-reflection from retro-reflection feature 22. In this bi-component fiber 400, retro-reflective feature 22 will provide multiple reflections of light incident on the feature 22 from within component 1. By including an additive in component 1, the additive is placed where it will be excited by multiple reflections. For certain applications, use of additive can be enhanced by using it in (or limiting its use to) the volume of component 1 where it will receive multiple reflections of light.

Figure 5:
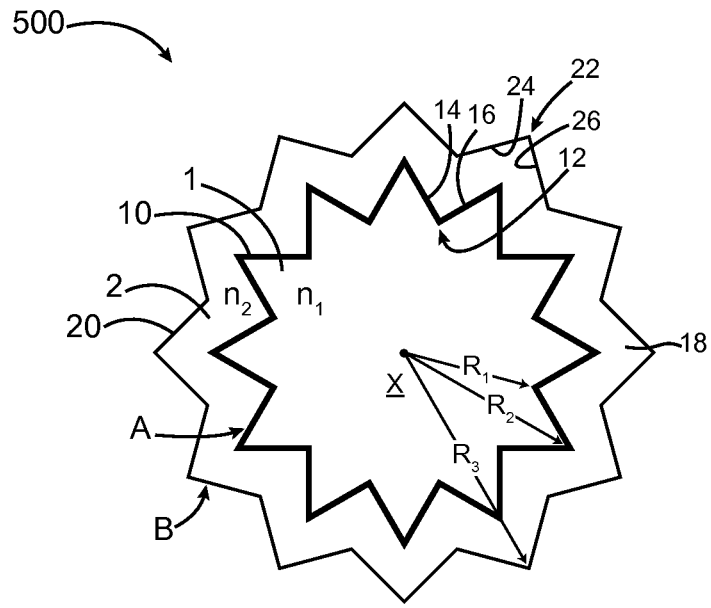
FIG. 5 schematically illustrates a cross section of a fiber of a retro-reflective article according to a further embodiment of the invention.

FIG. 5 illustrates exemplary bi-component fiber 500. The fiber 500 can include features and combinations thereof that are substantially the same as the fiber 300 of FIG. 300, with the modification(s) now described. The bi-component fiber 500 includes a first component 1 with first surface 10 and a second component 2 with second surface 20, and where second surface 20 additionally includes at least one retro-reflective feature 22 configured for retro-reflecting light back toward surface 10 of component 1.

According to one aspect, a series of retro-reflective features 12 are formed along the first surface 10, and a series of retro-reflective features 22 are formed along the second surface 20. At least one retro-reflective feature 12 of the first surface 10 and at least one retro-reflective feature 22 of the second surface 20 can be aligned opposite one another to define a concentric resonator region 18 therebetween. When light enters the resonator region 18 the retro-reflection features of the surfaces 10 and 20 are aligned to reflect a fraction of light back and forth, thereby providing multiple reflections in component 2 between retro-reflective features of the two surfaces. The resonator region 18 can be stimulated from light incident on or perhaps propagated by the fiber 500. For example, when a light ray is incident on the fiber from outside of the fiber 500 in a direction perpendicular to the longitudinal axis X, some of the light will enter the fiber and be transmitted to the resonator region 18.

Preferably the index of refraction n2 of outer component 2 is greater than the index of refraction n1 of component 1 so as to facilitate the multiple reflections occurring in the second component 2 between retro-reflectors 12 and 22 and resonance in the resonant region 18.

According to one aspect, the series of retro-reflective features 12 are adjacent one another along the perimeter of component 1 providing perimeter shape A (also see FIG. 1), and the series of retro-reflective features 2 are adjacent one another along the perimeter of component 2 providing perimeter shape B (also see FIG. 2), and the fiber 500 can be considered to comprise the fiber 100 of FIG. 1 disposed within the fiber 200 of FIG. 2, with the fibers 100 and 200 having different refractive indices. According to one aspect of this embodiment, the outermost points of first side 24 and second side 26 meet at radial distance R3 from the longitudinal axis X, and the inner most point of first side 24 and second side 26 are each at a radial distance R2 from the longitudinal axis X. According to one aspect, retro-reflective feature 22 is symmetric such that a radial line through the point at which first side 24 and second side 26 meet bisects the retro-reflective feature. According to one aspect, first side 24 and second side 26 each form substantially flat surfaces. According to one aspect, the first side 24 may be oriented approximately 90 degrees from second side 26.

Figure 6:
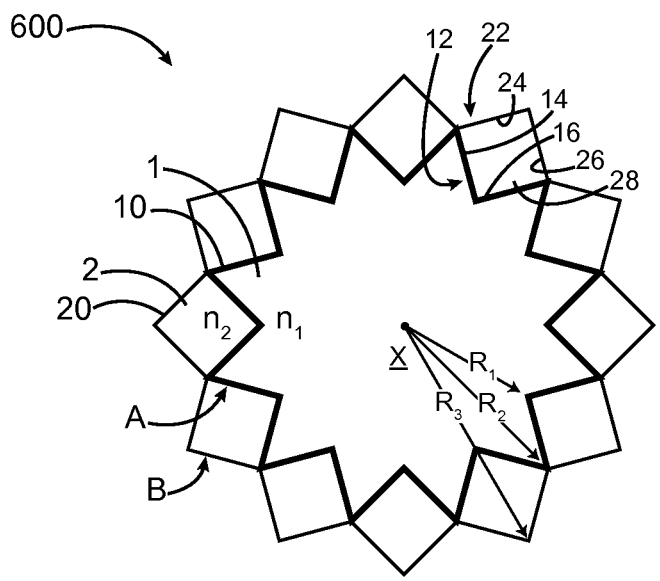
FIG. 6 schematically illustrates a cross section of a fiber of a retro-reflective article according to yet another embodiment of the invention.

FIG. 6 illustrates a bi-component fiber 600. The fiber 600 can include features, and combinations thereof, that are substantially the same as the fiber 500 of FIG. 5, with the modification(s) now described. Bi-component fiber 600 includes a first component 1 and second component 2. When compared to the embodiment of FIG. 5 component 1 is rotated in relation to component 2, such that the first surface 10 and second surface 20 define a closed off resonator region therebetween. According to one embodiment, the resonator region comprises a square resonator region 28 with a square cross sectional shape defined by the first and second sides 14 and 16 of a retro-reflector 12 and the first and second sides 24 and 26 of a retro-reflector 22 where retro-reflector 12 and retro-reflector 22 are aligned to retro-reflect light back and forth toward one another. When light enters the resonator region 28 the retro-reflection features of the surfaces 10 and 20 will reflect a fraction of light back and forth, thereby providing multiple reflections in component 2 between within the resonator region 28 defined by the retro-reflective features of the two surfaces. The resonator region 28 can be stimulated from light incident on or perhaps propagated longitudinally by the fiber 600. For example, for a light ray incident on the fiber from outside of the fiber 600 in a direction perpendicular to the longitudinal axis X, some of the light will enter the fiber and be transmitted to the resonator region 28.

According to one practice of the invention, a series of retro-reflective features 12 are formed along the first surface 10, and a series of retro-reflective features 22 are formed along the second surface 20, thereby forming a plurality of square regions 28. The retro-reflective features along first surface 10 can be substantially identical. The retro-reflective features along first surface 20 can be substantially identical.

Preferably the index of refraction n2 is greater than the index of refraction n1 so as to facilitate the multiple reflections and resonance in the resonator region(s) 28.

According to one aspect, the retro-reflective features 12 are adjacent one another along the perimeter of component 1 providing perimeter shape A, and the series of retro-reflective features 22 are adjacent one another along the perimeter of component 2 providing perimeter shape B, and aligned to create a series of square resonator regions 28 around the perimeter of the fiber 600. The retro-reflective features 10 can be substantially identical; the retro-reflective features 20 can be substantially identical.

According to other embodiments, the fiber may be a tri-component fiber.

Figure 7:
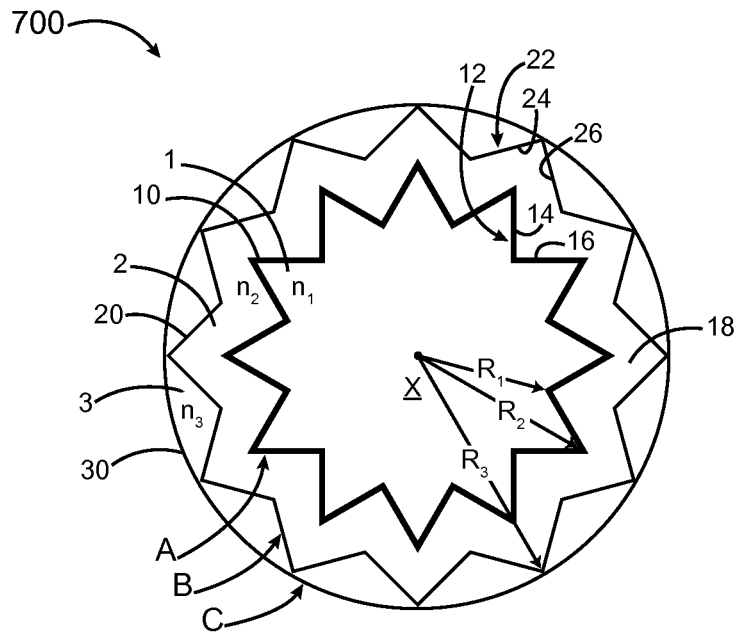
FIG. 7 schematically illustrates a cross section of a fiber of a retro-reflective article according to yet an additional embodiment of the invention.

FIG. 7 illustrates an exemplary tri-component fiber 700. The fiber 700 can include features, and combinations thereof, that are substantially the same as the fiber 500 of FIG. 5, with the modification(s) now described. The fiber 700 has a first component 1 with a first index of refraction n1 and a second component 2 with a second index of refraction n2 and in addition has a third component 3 with a third index of refraction n3. Component 3 includes third surface 30. Third component 3 surrounds component 1 and component 2. The retro-reflection and/or resonance properties of the concentric resonator region 18 between retro-reflection features 12 and 22 will be enhanced if index of refraction n2 is greater than both index of refraction n1 and index of refraction n3. The greater the difference of the indices of refraction n1 and n3, from n2, the greater the retro-reflection in the resonant region 18. Another advantage of including component 3 would be to include a sheath component to hold together components 1 and component 2 to assist in adhesion of the components.

Figure 8:
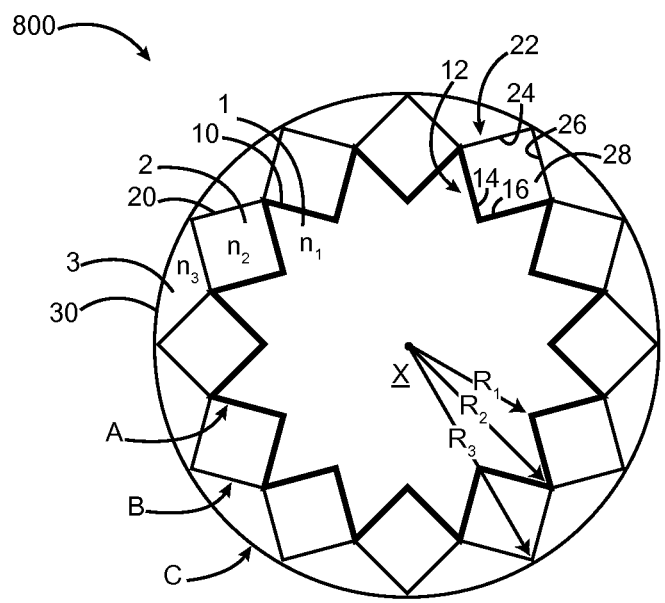
FIG. 8 schematically illustrates a cross section of a fiber of a retro-reflective article according to yet a further embodiment of the invention.

FIG. 8 illustrates an exemplary tri-component fiber 8. The fiber 800 can include features, and combinations thereof, that are substantially the same as fiber 600 of FIG. 6, with the modification(s) now described. The fiber 800 has a first component 1 with a first index of refraction n1 and a second component 2 with a second index of refraction n2 and in addition has a third component 3 with a third index of refraction n3. Component 3 includes third surface 30. Third component 3 surrounds component 1 and component 2. The retro-reflection/resonance properties of the square resonator region(s) 28 between retro-reflection features 12 and 22 will be enhanced if index of refraction n2 is greater than both index of refraction n1 and index of refraction n3. The greater the difference of the indices of refraction n1 and n3, from n2, the greater the retro-reflection in each resonant region 28. Another advantage of including component 3 would be to include a sheath component to hold together components 1 and component 2 to assist in adhesion between component 1 and component 2.

According to one aspect of the invention, components of any of the above fibers may comprise a polymer. For example, various polymers will maintain the desired strength of fiber while also providing the desired retro-reflective properties for desired applications, and compatibility with processing methods. Multi-component fibers can be comprised of polymers with different indices of refraction and a known affinity for each other. Exemplary polymers and their indices of refraction are:

| Polymer | Index of Refraction |
|---|---|
| Polypropylene | 1.4900 |
| Nylon 6,6 | 1.5680 |
| Polyester | 1.5780 |

Various materials offer significantly different functional properties which can be used as an advantage when producing a fiber consisting of multiple polymer components.

Fibers as described herein, including multi-component fibers such as bi-component fibers made up of two components present in the fiber cross-section, and tri-component fibers made up of three components present in the fiber cross-section can be made using a multi-component spinning machine that utilizes extruders. Suitable extruders can have the capacity to run at temperatures up to 350 degrees C. and provide an output of 1-6 lbs/hour of extruded fiber. A wide variety of fibers can be created with this equipment and can be even further expanded with the use of additives. Melt spinning consists of feeding polymer pellets into a hopper on one end of an extruder and, conveyed by a screw, into a barrel. The barrel exposes the pellets to heat and shear, allowing the pellets to soften and be further moved along the extrusion process. The action of the screw delivers the molten polymer to a metering pump which ensures consistent polymer flow to the spinneret. The melt pumps use pressure to force the polymer stream to the spinneret where the shape of the fiber is formed. For example for a tri-component fiber, three melt pumps help to ensure a consistent melt flow and pressure for fiber consistency. The angle between the sides of the retro-reflective features can be controlled or changed by varying the melt pump ratio between the two polymers. Increasing or decreasing the ratio results in a slight change in the angle. The change in angle can be more dramatic depending on polymers selected for the fiber cross section. Melt pump speed can affect the angle that provides the optical response, however, the draw ratio typically does not change this angle. This allows the fiber to be drawn and impart necessary physical properties while maintaining desired properties. According to one method, a fiber was produced with retro-reflective features with an approximately 90 degree angle between sides of the retro-reflective feature with an overall fiber diameter between 350 and 390 microns prior to drawing the fiber to a smaller diameter. It was also demonstrated that drawing the fiber to a smaller diameter did not adversely affect the retro-reflective features, and successfully reduced the overall fiber diameter to 100 microns.

The addition of one or more additives to a single component fiber or a fiber having more than one component can achieve a variety of optical effects. The fabrication of fibers using the extrusion process is conducive to use of additives and to containing the additive in the various components.

The addition of additives can occur either through incorporation of additive into the material of a desired component or by application at specific locations at the interfaces of the fiber cross section, or on the fiber most outer surface. Thus, according to this invention optimal placement of additives can be achieved with inexpensive processing techniques. For example, additives creating fluorescence can be included in the fiber. In some instances, post-processing can be eliminated.

Exemplary additives beneficial in obtaining the desired optical properties may include dyes, fluorophores, phosphor, nanoparticles, cholesteric liquid crystal, and metal oxide. The use of the additive can be optimized in many applications by using the additive where the at least one retro-reflection feature as described herein provides multiple reflections, and where resonant regions additionally provide multiple reflections between surfaces.

The addition of dyes may be used to absorb wavelengths in order to control the bandwidth and peak of reflected wavelengths.

The addition of fluorophores can enhance reflective properties. The fiber of the present invention is particularly conducive to the addition of fluorophores, either through incorporation into the fiber component material or by application at specific locations on the interfaces of the multi-component fiber cross-section.

In the case of a multi-component fiber with a resonant region defined between retro-reflective features reflecting toward one another, there will be an enhancement of the emission properties of additives such as fluorophores and phosphors due to multiple reflections in the resonate region from the retro-reflective features as described herein.

Field enhancement can further increase local field strength by many orders of magnitude, and is especially effective at improving the emission of fluorophores. Field enhancement can be accomplished within the fiber by a variety of means.

In addition, thin films containing a fluorophore can be added at the fiber surface. The thin film containing fluorophore will form a weakly resonant structure that will enhance fluorophore emission.

The addition of phosphor can enhance reflective properties. More specifically, phosphors such as quantum dots can be used.

Excitation of the fiber containing a phosphor or a fluorophore can be through the end of the fiber by total internal reflection, or it can be excited from the outside of the fiber perpendicular, or at some arbitrary acute or obtuse angle to the longitudinal axis of the fiber. In either case, fluorescence can be monitored through the end of the fiber via total internal reflection, or it can be observed via scattering through the fiber side. A fiber having retro-reflective features on the outer surface of the fiber will have a greater outside surface area which can be useful for a chemical or biological sensor application. Thus, the fiber architecture is conducive for use as chemical and bio-sensors, in hazard detectors.

In the example of FIGS. 5 and 7, use of the additive in the concentric resonator region 18 where it will be exposed to multiple reflections between the retro-reflective features 12 and 22 will enhance the optical properties obtained from using the additive. For example, the benefit of adding phosphor or fluorophore to component 2 is that the concentric resonator 18 will enhance the magnitude of fluorescence through multiple reflections in the resonator region 18 between retro-reflective features 12 and 22.

In the example of FIGS. 6 and 8, use of the additive in the square resonator regions 28 where it will be exposed to multiple reflections between the retro-reflective features 12 and retro-reflective features 22 will enhance the optical properties obtained from using the additive. For example, the benefit of adding phosphor or fluorophore to component 2 is that the square resonator regions 28 will enhance the magnitude of fluorescence through multiple reflections in the resonator region between retro-reflective features 12 and 22.

In addition, the addition of nanoparticles into the fiber can produce field enhancement to increase the emission of phosphors and fluorophores. Commercially available nanoparticles can be tuned to resonate at desired wavelength bands. Example nanoparticles are nanoshells and nanotubes. Nanoparticles can be chosen to resonate at the excitation wavelength and reflect at emission wavelength. According to one example, the greatest effect of use of nanoparticles is achieved by incorporating the nanoparticles and fluorophores into the same component.

Further, a fiber may be conductive, such as by using a conductive material as an additive, and configured such that applying a voltage across a length of the fiber alters the reflective or absorptive characteristics of the additive. For example photochromic or electrochromic dye or cholesteric liquid crystal may be added to the fiber material. Applying a voltage across the length of the fiber it would be possible to alter the reflective or absorptive characteristics of the dye or liquid crystal.

While post processing will no longer be required for certain applications, post-processing can still be implemented. For some applications, the desired retro-reflective properties can be attained by coating at least a portion of the fiber with a reflective coating.

The coating may be a reflective metal applied to enhance retro-reflection properties. There will be no penetration of light into the fiber through the coating and the retro reflectance will be enhanced. For example, silver is a reflective metal that may be deposited on the outside of the fiber to attain a desired optical property.

According to one example, at least one retro-reflective feature can be coated with a reflective coating. According to one example, 180 degrees of the fiber may be coated with a reflective coating. According to one example, half the outer surface of the fiber will retro-reflect strongly after the light has entered the portion of fiber not coated. If dye has been added to the fiber, there can be strong dye excitation interaction within the fiber and virtually all of the light, except that portion which is absorbed in the fiber, will be reflected back out of the fiber. This geometry would also serve as the basis for plasmonic coupling into the film. The fiber features can be thought of as tapered waveguides that are known to provide an efficient means by which to launch propagating Plasmon polaritons, which may serve as the basis for a fiber with meta-material properties.

Post processing such as thin film deposition can be implemented. Thin films, such as dielectric stacks may be applied to reduce or enhance desired reflected wavelengths. Retro-reflective feature flat surfaces are particularly conducive to the application of thin films.

If the fiber cross section features are larger than the wavelength of incident light, they will behave as a prism, and should exhibit colorful refraction and diffraction properties. Diffraction of light may also occur when the fibers are arranged in a periodic pattern.

The fiber can also be configured such that the retro reflection from the retro reflective feature is polarization dependent such that light polarized with its electric field parallel to the longitudinal axis is more highly retro reflected by the retro reflective feature than light polarized such that its electric field is perpendicular to the longitudinal axis of the fiber. For example, if the retro-reflective features are made to be smaller than a wavelength of incident light according to the expression $\lambda/2n$, where n is the index of refraction of the fiber, then reflection would become polarization dependent. Polarized light with the e-field parallel to the longitudinal axis would be reflected. Light with the e-field polarized perpendicular to the longitudinal axis would be transmitted into the fiber, and hence less reflected, because the features would be too small to retro-reflect the light. The addition of metal oxide may be used for photovoltaic fiber applications.

In addition to having retro-reflective effects, the retro-reflective features of the fibers described herein may also exhibit refraction and diffraction qualities as well. They may also exhibit prismatic and/or multiple order diffraction interference patterns. When illuminated with white light, the fiber may appear colorful.

Many of the effects described herein may be augmented by incorporating the fiber into a periodic array, as a periodic structure may have unique filtering or reflectance properties. Articles with fibers incorporated into patterns of woven, braided, knitted and spun, and the like patterns, may have unique optical properties as a result of the continuously curved surface and resulting continuously varying angle of incidence of light.

While the figures provided herein illustrate embodiments of retro-reflective features having sides meeting at the base of the retro-reflective feature and defining a sharp corner, it will be appreciated that the drawings are provided as schematics and it is not necessary that the sides meet at a sharp corner. The extrusion fabrication technique described herein provides a fiber with desired retro-reflective features having a first side and a second side at an approximately 90 degree angle where the sides are joined with a slight arc at the base of the retro-reflective feature.

There are many applications for an article according to the present invention. For example the article of the present invention could be a textile woven from at least one fiber as described herein. For example, the article of the present invention could comprise apparel such as clothing, decorative items, jewelry, for primarily aesthetic qualities and also safety products for visibility at night such as reflective clothing, and flexible reflectors. In addition, the article could be a sensor or hazard detector utilizing the optical properties of the fiber, and changes in optical properties as a result of presence of the hazard. For example, the article could be a chemical sensor or biological sensor, and such sensor could be incorporated into a multi-function article. In addition, the change in optical properties could signal a change in direction, and the article could be used for line-of-site communication applications.

The present disclosure is directed to each individual feature, system, material, and/or method described herein. In addition, any combination of two or more such features, systems, materials, and/or methods, if such features, systems, materials, and/or methods are not mutually inconsistent, is included within the scope of the present invention. To avoid undue repetition, not all features are discussed in conjunction with every aspect, embodiment or practice of the disclosure. Features described in conjunction with one aspect, embodiment or practice are deemed to be includable with others absent mutual inconsistency or a clear teaching to the contrary. In some instances, features will be discussed generally rather than in detail in conjunction with a specific aspect, embodiment or practice, and it is understood that such features can be included in any aspect, embodiment or practice, again absent mutual inconsistency or a clear teaching to the contrary.

Those of ordinary skill in the art will readily envision a variety of other means and structures for performing the functions and/or obtaining the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teachings of the present invention are used. Accordingly, the foregoing embodiments are presented by way of example only and that within the scope of the appended claims, and equivalents thereto, the invention may be practiced otherwise than as specifically described.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 8th Edition, Revision 8. Furthermore, statements in the specification, such as, for example, definitions, are understood to be open ended unless otherwise explicitly limited.

The phrase "A or B" as in "one of A or B" is generally meant to express the inclusive "or" function, meaning that all three of the possibilities of A, B or both A and B are included, unless the context clearly indicates that the exclusive "or" is appropriate (i.e., A and B are mutually exclusive and cannot be present at the same time). "At least one of A, B or C" (as well as "at least one of A, B and C") reads on any combination of one or more of A, B and C, including, for example the following: A; B; C; A & B; A & C; B & C; as well as on A, B & C.

It is generally well accepted in patent law that "a" means "at least one" or "one or more." Nevertheless, there are occasionally holdings to the contrary. For clarity, as used herein "a" and the like mean "at least one" or "one or more." The phrase "at least one" may at times be explicitly used to emphasize this point. Use of the phrase "at least one" in one claim recitation is not to be taken to mean that the absence of such a term in another recitation (e.g., simply using "a") is somehow more limiting. Furthermore, later reference to the term "at least one" as in "said at least one" should not be taken to introduce additional limitations absent express recitation of such limitations. For example, recitation that an apparatus includes "at least one" feature with a particular characteristic does not mean the claim requires all features to have the specified characteristic.

What is claimed is:

1. A retro-reflective article, comprising:
   at least one fiber having a first component with a first surface;
   the first surface shaped to define at least one retro-reflective feature;
   wherein the retro-reflective feature is configured to provide more than one reflection of light incident thereon;
   wherein the fiber extends longitudinally and the retro-reflective feature is formed along the length of the fiber; and
   further comprising a reflective metal coating that coats the retro-reflective feature.

2. The retro-reflective article of claim 1, wherein the fiber is flexible.

3. The retro-reflective article of claim 1, wherein the fiber comprises a plurality of retro-reflective features.

4. The retro-reflective article of claim 3, wherein the plurality of retro-reflective features are positioned in series along a perimeter of the cross section of the fiber.

5. The retro-reflective article of claim 1, wherein the at least one retro-reflective feature comprises a first side and a second side, and wherein the first side intersects the second at approximately a ninety degree angle.

6. The retro-reflective article of claim 1, wherein the at least one fiber is configured to retro-reflect light incident upon the retro-reflective feature from the outside of the fiber.

7. The retro-reflective article of claim 1, wherein the fiber is configured to retro-reflect light incident upon the at least one retro-reflective feature from the inside of the fiber.

8. The retro-reflective article of claim 1, wherein the fiber comprises a polymer.

9. The retro-reflective article of claim 1, wherein the article comprises a periodic structure with the at least one fiber interlaced in the periodic structure.

10. The retro-reflective article of claim 1, wherein the article comprises a textile.

11. The retro-reflective article of claim 1, wherein the article comprises apparel.

12. The retro-reflective article of claim 1, wherein the article comprises a sensor.

13. The retro-reflective article of claim 1, wherein the fiber comprises a second component having a second surface, and where the first and second components each have different refractive indices.

14. The retro-reflective article of claim 13, wherein
   the second surface is shaped to define at least one retro-reflective feature; and wherein the retro-reflective feature of the second surface is configured to provide more than one reflection of light incident thereon.

15. A retro-reflective article, comprising:
   at least one fiber having a first component with a first surface;
   the first surface shaped to define at least one retro-reflective feature;
   wherein the retro-reflective feature is configured to provide more than one reflection of light incident thereon;
   wherein the fiber comprises a second component having a second surface, and where the first and second components each have different refractive indices; and
   wherein the first and second surfaces define at least one resonant region therebetween.

16. The retro-reflective article of claim 15, wherein the resonant region comprises at least one retro-reflective feature defined by the first surface and at least one retro-reflective feature defined by the second surface, the retro-reflective features aligned to retro-reflect light toward the other.

17. The retro-reflective article of claim 1, wherein the fiber comprises at least one additive comprising a fluorophore, a phosphor, a nanoparticle, a metal oxide, a liquid crystal or a dye.

18. A retro-reflective article, comprising:
   at least one fiber having a first component with a first surface;
   the first surface shaped to define at least one retro-reflective feature;
   wherein the retro-reflective feature is configured to provide more than one reflection of light incident thereon; and
   wherein the fiber comprises an additive and a conductive material and is configured such that applying a voltage across a length of the fiber alters the reflective or absorptive characteristics of the additive.

19. A retro-reflective article, comprising:

at least one fiber having a first component with a first surface;

the first surface shaped to define at least one retro-reflective feature;

wherein the retro-reflective feature is configured to provide more than one reflection of light incident thereon;

wherein the fiber extends longitudinally and the retro-reflective feature is formed along the length of the fiber; and further comprising a dielectric stack of thin films.

20. A retro-reflective article, comprising:

at least one fiber having a first component with a first surface;

the first surface shaped to define at least one retro-reflective feature;

wherein the retro-reflective feature is configured to provide more than one reflection of light incident thereon; and wherein the fiber comprises a longitudinal axis and is configured such that the retro-reflection from the retro reflective feature is polarization dependent such that light polarized with its electric field parallel to the longitudinal axis is more highly retro-reflected by the retro-reflective feature than light polarized such that its electric field is perpendicular to the longitudinal axis of the fiber.

* * * * *